(12) United States Patent
Shimokawa

(10) Patent No.: US 9,283,894 B2
(45) Date of Patent: Mar. 15, 2016

(54) WIRELESS POWER SUPPLY SYSTEM

(75) Inventor: Satoshi Shimokawa, Kawasaki (JP)

(73) Assignee: FUJITSU LIMITED, Kawasaki-shi (JP)

(*) Notice: Subject to any disclaimer, the term of this patent is extended or adjusted under 35 U.S.C. 154(b) by 269 days.

(21) Appl. No.: 13/227,972

(22) Filed: Sep. 8, 2011

(65) Prior Publication Data
US 2011/0316334 A1    Dec. 29, 2011

Related U.S. Application Data

(63) Continuation of application No. PCT/JP2009/055155, filed on Mar. 17, 2009.

(51) Int. Cl.
| | |
|---|---|
| *H01F 27/42* | (2006.01) |
| *B60R 1/07* | (2006.01) |
| *B60R 16/03* | (2006.01) |
| *H02J 5/00* | (2006.01) |
| *H02J 17/00* | (2006.01) |

(52) U.S. Cl.
CPC . *B60R 1/07* (2013.01); *B60R 16/03* (2013.01); *H02J 5/005* (2013.01); *H02J 17/00* (2013.01)

(58) Field of Classification Search
CPC .................................. H02J 17/00; B60R 1/07
USPC .......................................................... 307/104
See application file for complete search history.

(56) References Cited

U.S. PATENT DOCUMENTS

| | | | |
|---|---|---|---|
| 6,176,433 B1 | 1/2001 | Uesaka et al. | |
| 7,366,595 B1 | 4/2008 | Shimizu et al. | |
| 8,305,036 B2 * | 11/2012 | Toya et al. | 320/108 |
| 2006/0281435 A1 * | 12/2006 | Shearer et al. | 455/343.1 |
| 2006/0287825 A1 | 12/2006 | Shimizu et al. | |
| 2006/0287826 A1 | 12/2006 | Shimizu et al. | |
| 2007/0216348 A1 | 9/2007 | Shionoiri et al. | |

(Continued)

FOREIGN PATENT DOCUMENTS

| | | |
|---|---|---|
| AU | 2006269374 A1 | 1/2007 |
| CA | 2 567 634 | 12/2005 |

(Continued)

OTHER PUBLICATIONS

Int'l. Search Report issued in Int'l. App. No. PCT/JP2009/055155, mailed Jun. 30, 2009.

(Continued)

*Primary Examiner* — Daniel Cavallari
(74) *Attorney, Agent, or Firm* — Greer Burns & Crain Ltd.

(57) ABSTRACT

A wireless power supply system has a power sending resonance coil, a power receiving resonance coil, and a relay resonance coil. The power sending resonance coil has a predetermined resonance frequency characteristic, and transmits power wirelessly. The power receiving resonance coil has the same resonance frequency characteristic as the power sending resonance coil, and receives power wirelessly with a magnetic field resonance mode generated by synchronization of the resonance frequency. The relay resonance coil has the same resonance frequency characteristic as the power sending resonance coil and the power receiving resonance coil, and relay power from the power sending resonance coil to the power receiving resonance coil wirelessly with the magnetic field resonance mode generated by synchronization of the resonance frequency with them.

7 Claims, 11 Drawing Sheets

(56) References Cited

U.S. PATENT DOCUMENTS

| | | | |
|---|---|---|---|
| 2007/0222542 | A1 | 9/2007 | Joannopoulos et al. |
| 2008/0266748 | A1 | 10/2008 | Lee |
| 2008/0278264 | A1 | 11/2008 | Karalis et al. |
| 2009/0058189 | A1 | 3/2009 | Cook et al. |
| 2009/0153273 | A1 | 6/2009 | Chen et al. |
| 2010/0127660 | A1* | 5/2010 | Cook et al. .................. 320/108 |
| 2011/0220639 | A1* | 9/2011 | Gerhardinger .............. 219/660 |
| 2013/0342025 | A1 | 12/2013 | Cook et al. |

FOREIGN PATENT DOCUMENTS

| | | |
|---|---|---|
| CA | 2615123 A1 | 1/2007 |
| CN | 101044664 A | 9/2007 |
| CN | 101385218 A | 3/2009 |
| EP | 1065642 A2 | 1/2001 |
| EP | 1400410 A2 | 3/2004 |
| EP | 1779550 | 2/2006 |
| EP | 1902505 | 1/2007 |
| EP | 1766753 | 3/2007 |
| EP | 1870870 A1 | 12/2007 |
| JP | A-7-143065 | 6/1995 |
| JP | A-11-32452 | 2/1999 |
| JP | 3002081 B2 | 11/1999 |
| JP | 2006-074848 | 3/2006 |
| JP | A-2008-503196 | 1/2008 |
| JP | 2008-508842 | 3/2008 |
| JP | 2009-501510 | 1/2009 |
| JP | 2010-148273 | 7/2010 |
| JP | 2011-514781 | 5/2011 |
| KR | 10-2007-0017804 | 2/2007 |
| KR | 10-20007-0017804 | 2/2007 |
| KR | 10-2008-0031398 | 4/2008 |
| WO | WO 2005/122686 A2 | 12/2005 |
| WO | WO 2005/122686 A3 | 12/2005 |
| WO | WO 2006/011769 A1 | 2/2006 |
| WO | WO 2007/008646 A2 | 1/2007 |
| WO | WO 2008/118178 A1 | 10/2008 |
| WO | 2009/111597 | 9/2009 |

OTHER PUBLICATIONS

Korean office action issued in App. No. 10-2011-7020930 mailed Oct. 26, 2012.

Korean office action issued in App. No. 10-2013-7004274 mailed Apr. 26, 2013 (with translation).

Chinese office action issued in App. No. 2009-801580554.8, issued May 29, 2013 (with translation).

Machine translation of JP-A-7-143065 filed Jun. 2, 1995 (JP document previously submitted in an IDS).

Korean office action issued in App. No. 10-2011-7020930 mailed Mar. 28, 2013 (with translation).

Chinese office action issued in App. No. 2009-80158054.8, issued Dec. 6, 2013 (with translation).

Rejection Decision issued by the Patent Office of the People's Republic of China for corresponding CN Application No. 200980158054.8, issued Aug. 4, 2014 (with partial English language translation).

Office Action issued by the Chinese Patent Office in corresponding Application No. 200980158054.8, issued Mar. 26, 2015 (with translation).

Notice of Rejection Ground issued by the Patent Office of Japan for corresponding JP Application No. 2013-134218, mailed Jul. 22, 2014 (with English language translation).

Notice of Rejection Grounds issued by the Patent Office of Japan for corresponding JP Application No. 2013-134218, mailed Apr. 22, 2014, pp. 1-7.

Zhu et al., "Simulation and Experimental Analysis on Wireless Energy Transfer Based on Magnetic Resonances," IEEE Vehicle Power and Propulsion Conference (VPPC), Sep. 3-5, 2008, China, pp. 1-5.

Supplementary European Search Report issued in EP 09 84 1841, issued Jan. 31, 2014.

Office Action issued by the Chinese Patent Office dated Apr. 17, 2014 issued in corresponding Chinese Patent Application No. 200980158054.8. (Full Translation).

Chinese office action issued in App. No. 2009-80158054.8, issued May 29, 2013 (with translation).

* cited by examiner

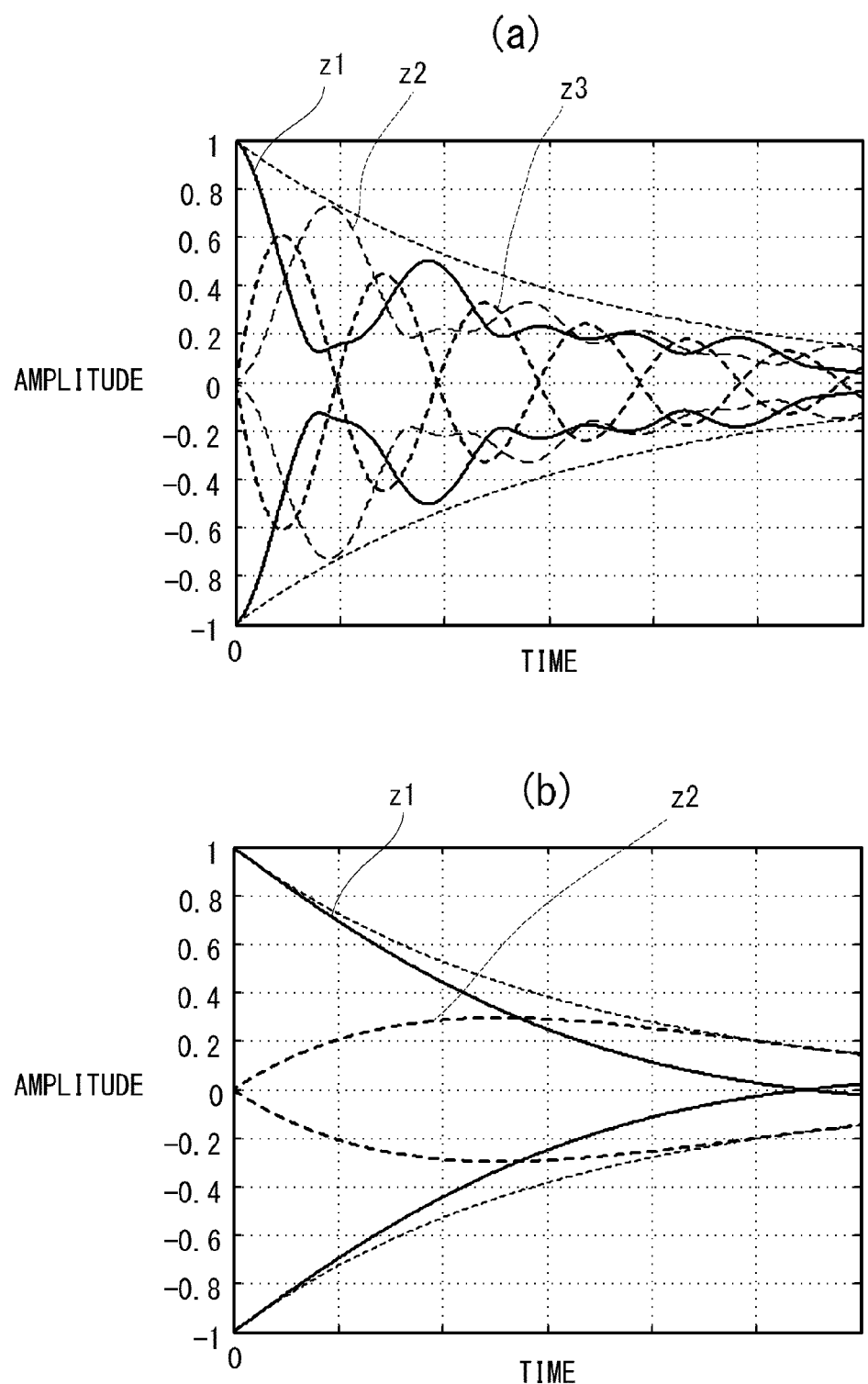
F I G. 5

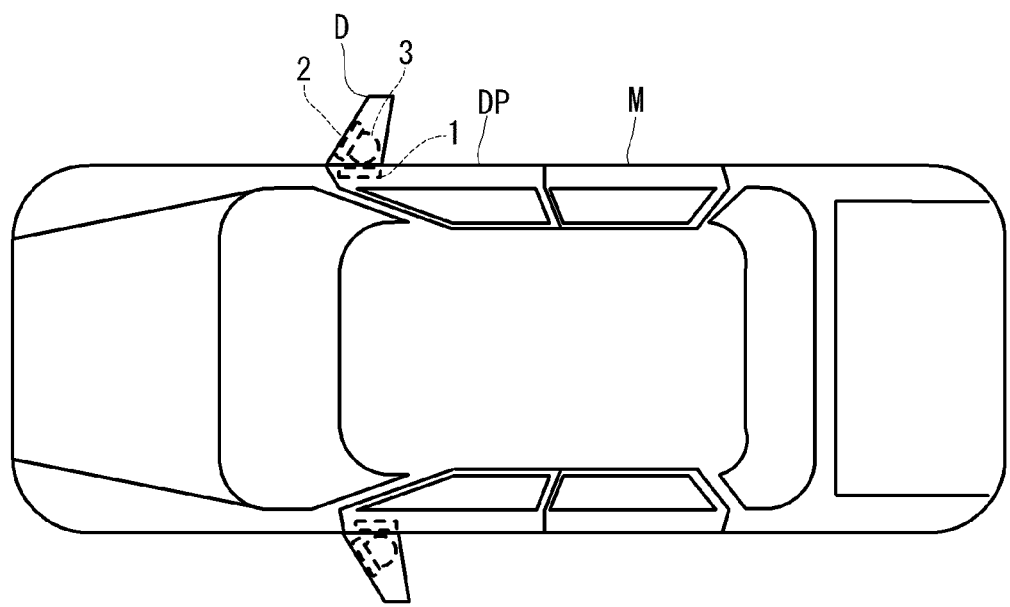
F I G. 8

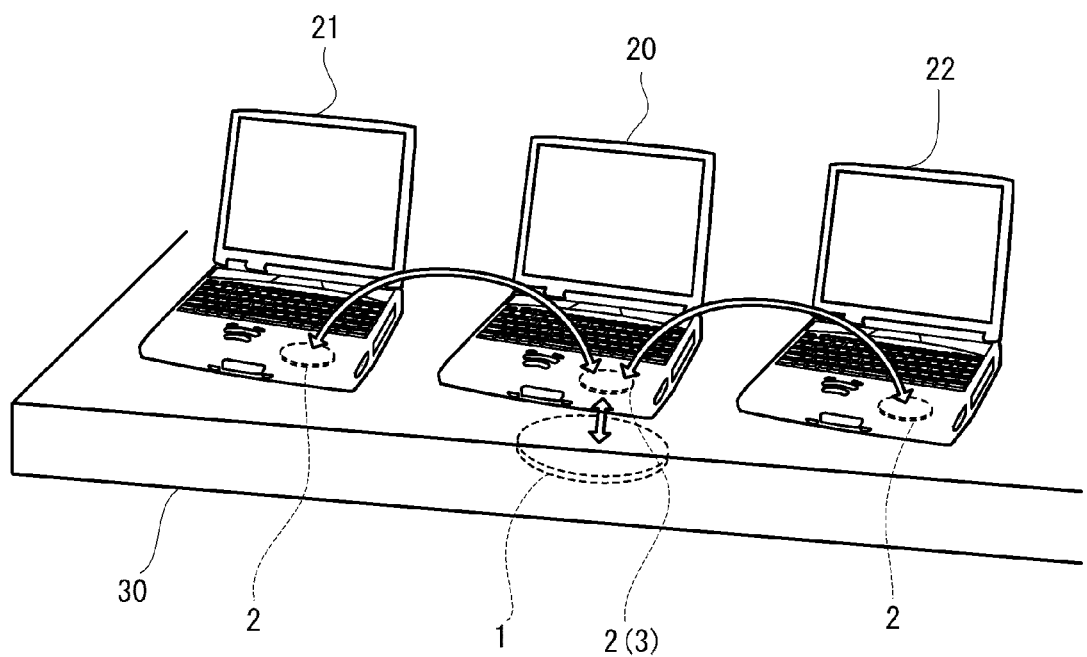
F I G. 10

WIRELESS POWER SUPPLY SYSTEM

CROSS-REFERENCE TO RELATED APPLICATIONS

This application is a continuation application of International Application PCT/JP2009/055155 filed on Mar. 17, 2009 and designated the U.S., the entire contents of which are incorporated herein by reference.

FIELD

The present invention relates to a wireless power supply system supplying power wirelessly under the so-called magnetic field resonance mode.

BACKGROUND

As a wireless power supply technique, a technique using the magnetic field resonance mode as disclosed in Patent Document 1 has been proposed in recent years, instead of the ones using electromagnetic induction. In the wireless power supply technology under the magnetic field resonance mode, for example, a resonator having a resonance angle frequency $\omega1$ is provided in the power sending apparatus, and a resonator having a resonance angle frequency $\omega2$ is provided in the power receiving apparatus. As the resonator, a resonance circuit in which a coil and condenser are connected is utilized. By synchronizing these resonance angle frequencies $\omega1$ and $\omega2$ and adjusting the size and alignment of the resonators appropriately, a magnetic field coupling state where energy transfer by the magnetic field resonance mode can be performed is generated between the power sending apparatus and the power receiving apparatus, and power is transferred from the resonator of the power sending apparatus to the resonator of the power receiving apparatus wirelessly. According to such a wireless power supply technique, the usage efficiency of power (energy transfer efficiency) is about several dozen % and the distance between the apparatuses can be relatively large, so the power receiving apparatus can be placed about several dozen centimeters away from the power sending apparatus.

Patent Document 1: Japanese Laid-open Patent Publication No. 2009-501510

SUMMARY

However, in the wireless power supply technique, since the coil has directionality in the same manner as in the case with electromagnetic induction, there has been a disadvantage that depending on the positional relationship between the power sending apparatus and the power receiving apparatus, power supply becomes difficult. For example, the case where the coil axis of the power sending side coil and the coil axis of the power receiving side coil are in the crossed, parallel, or twisted positional relationship is considered. In this case, the perpendicular component of the magnetic line extending from the power sending side coil and passing through the power receiving side coil is necessarily smaller than in the coaxial case, and in accordance with it, the strength of the magnetic field becomes small. Accordingly, the magnetic field coupling state in the magnetic field resonance mode becomes weak between the power sending apparatus and the power receiving apparatus whose coil axes are misaligned, resulting in a state where little or no power can be transmitted.

The present invention has been conceived under the situation described above. The purpose of the present invention is to provide a wireless power supply system capable of relaying power from the power sending side and transmitting to the power receiving side efficiently.

In order to solve the above challenge, the present invention takes the following technical measures.

According to the present invention, a wireless power supply system as described below is provided. A wireless power supply system includes a power sending resonance coil, a power receiving resonance coil, and one or more relay resonance coils. The power sending resonance coil has a resonance frequency characteristic, and transmits power wirelessly. The power receiving resonance coil has the same resonance frequency characteristic as the power sending resonance coil, and receives power wirelessly with a magnetic field resonance mode generated by synchronization of the resonance frequency. The relay resonance coil has the same resonance frequency characteristic as the power sending resonance coil and the power receiving resonance coil, and relay power from the power sending resonance coil to the power receiving resonance coil wirelessly with the magnetic field resonance mode generated by synchronization of the resonance frequency with them. The angle at which a magnetic line extending from the power sending resonance coil and directly going through the power receiving resonance coil crosses the coil axis of the power receiving resonance coil is assumed as an crossing angle $\alpha$. The angle at which a magnetic line extending from the power sending resonance coil or another relay resonance coil and going through the relay resonance coil crosses the coil axis of the relay resonance coil is assumed as an crossing angle $\beta0$. The angle at which a magnetic line extending from the relay resonance coil and going through the power receiving resonance coil or another relay resonance coil crosses the coil axis of the power receiving resonance coil or the other relay resonance coil is assumed as an crossing angle $\beta1$. In that case, the relay resonance coil is placed so as to realize $0°\leq\beta0\leq\alpha\leq90°$, and $0°\leq\beta1\leq\alpha\leq90°$.

Other features and advantages of the present invention will become clearer by detail explanation made below with reference to the attached drawings.

BRIEF DESCRIPTION OF DRAWINGS

FIG. 5 is an explanatory diagram to explain the effectiveness of the case using a relay resonance coil.

FIG. 8 is a plain view illustrating example 1 of a wireless power supply system according to the present invention.

FIG. 10 is an oblique perspective view illustrating example 2 of a wireless power supply system according to the present invention.

DESCRIPTION OF EMBODIMENTS

Hereinafter, preferred embodiments of the present invention will be explained specifically with reference to drawings.

Figure 1:
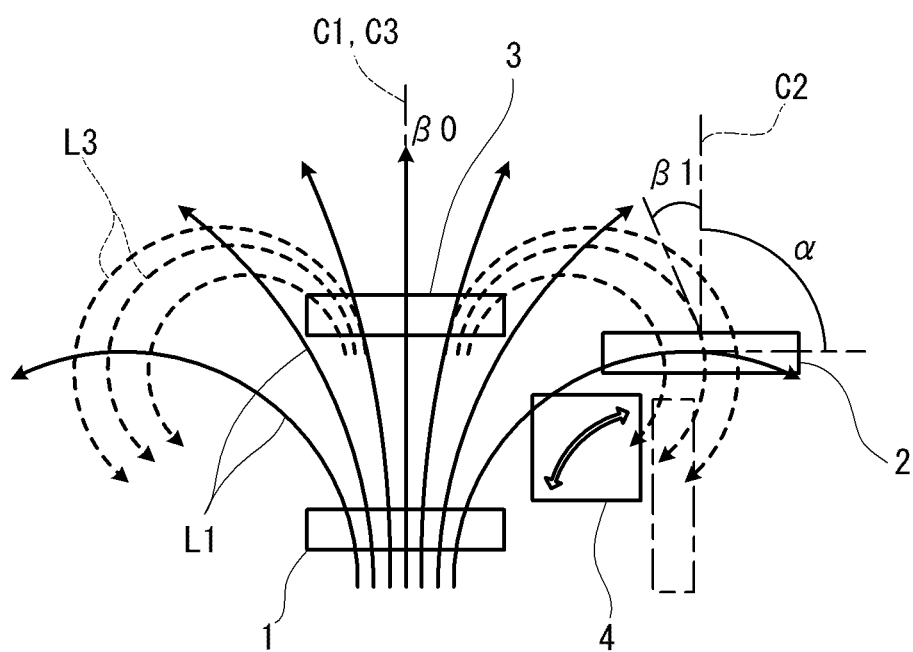
FIG. 1 is a schematic diagram illustrating an embodiment of a wireless power supply system according to the present invention.
Figure 2:
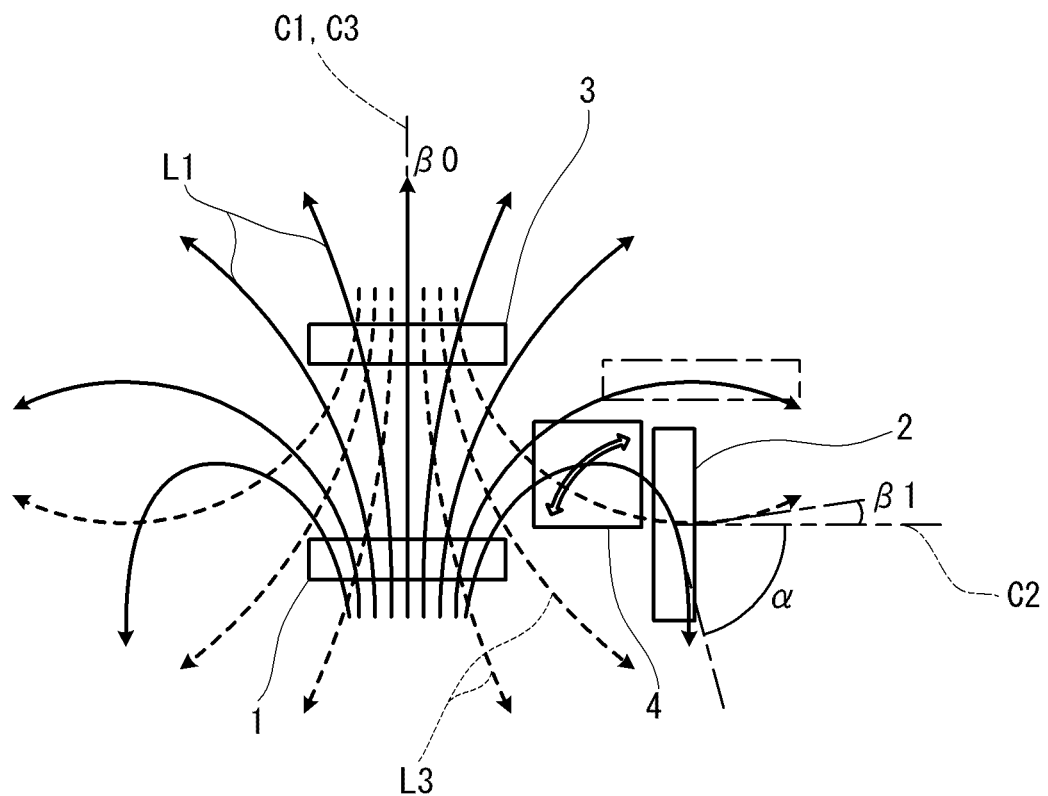
FIG. 2 is a schematic diagram illustrating a modification example of a wireless power supply system in FIG. 1.
Figure 3:
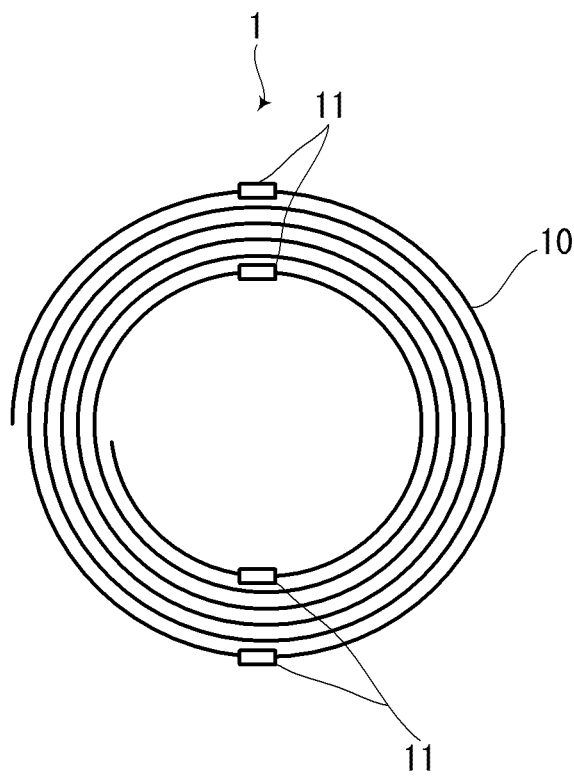
FIG. 3 is a plane view of a resonance coil to be a constituent element.

FIGS. 1-3 illustrate an embodiment of a wireless power supply system according to the present invention. The wireless power supply system of the present embodiment has a power sending resonance coil 1, a power receiving resonance coil 2, and a relay resonance coil 3 as basic constituent elements. In the wireless power supply system, a posture control apparatus 4, for example, for controlling the posture of the power receiving resonance coil 2 is included.

The power sending resonance coil 1 is a coil whose both ends are open. The power sending resonance coil 1 is not connected to the electric circuit in order to increase the Q value. The Q value is an indicator representing the sharpness of resonance, which is determined by the pure resistance and the radiation resistance of the coil, and a larger Q value can be obtained with these values being smaller. The power sending resonance coil 1 has a capacitor with the floating capacity. Accordingly, the power sending resonance coil1 becomes an LC resonance circuit. The resonance frequency f of the power sending resonance coil 1 as an LC resonance circuit is obtained by the following expression with the inductance: L and the capacity of the capacitor: C.

$$f = \frac{1}{2\pi\sqrt{LC}}$$

Power is supplied to the power sending resonance coil 1 from a power supply coil that is not illustrated in the drawing via the electromagnetic induction. The power supply coil is placed to be at a short distance away such that power can be supplied to the power sending resonance coil 1 via the electromagnetic induction. The power supply coil is connected to a power supply that is not illustrated in the drawing via an oscillation circuit. The oscillation circuit transmits alternating-current power of a predetermined frequency determined by the resonance frequency of the power sending resonance coil 1. In power supply from such a power supply coil to the power sending resonance coil 1, since electromagnetic induction, not magnetic field resonance, is mainly used, the resonance frequency does not need to be considered. Therefore, for the power supply coil, change of the frequency of the oscillation circuit does not need to be considered. Accordingly, in the case in which a power supply coil using electromagnetic induction is used, it becomes possible to improve the degree of freedom of design of the oscillation circuit.

Considering an equivalent circuit of the power sending resonance coil 1, as illustrated in FIG. 3, the power sending resonance coil 1 includes an air core coil unit 10, and a capacitor 11 connected serially to the coil unit 10. Assuming the inductance of the coil unit 10 as L, the capacitance (floating capacitance) of the capacitor 11 as C and the frequency of the alternating-current power supplied from the oscillation circuit as f, the power sending resonance coil 1 enters the resonance state when the frequency f of the alternating-current power becomes the frequency of the expression Math.1 above. This frequency f becomes the resonance frequency. In the resonance state, energy is periodically exchanged from the electric field by the voltage inside the capacitor 11 into the magnetic field of the free space by the current flowing in the coil unit 10. When a resonance coil (the relay resonance coil 3) having the resonance frequency f matching the power sending resonance coil 1 in the resonance state is brought close to the power sending resonance coil 1 in the posture according to the condition described later, the resonance coil resonates by the magnetic field from the power sending resonance coil 1. Such a resonance phenomenon by the magnetic field is referred to as a magnetic field resonance mode. In the magnetic field resonance mode, power of the power sending resonance coil 1 is transmitted wirelessly to resonance coil brought close thereto.

Meanwhile, the matching resonance frequency f here does not mean an exact match. Even though the resonance frequencies of a plurality of resonance circuits may match in a simulation and the like, the resonance frequencies of a plurality of resonance circuits do not match in reality. Therefore, the matching resonance frequency f represents practically-matching frequency. The range of the practical match is determined by the Q value. The range of the practical match narrows as the Q value becomes higher, and in an opposite manner, expands as the Q value becomes lower. A guideline of the range of the practical match is the frequency range in which the value of the resonance point becomes a half value. In another expression, the range of the practical match is a frequency range in which power can be transmitted with a higher efficiency than that for electromagnetic induction. Meanwhile, such a range of the practical match is obviously a matter determined within the range of common knowledge of those skilled in the art. However, engineers who do not possess common knowledge of those skilled in the art may refer from time to time. The above explanation is included in consideration of such a case, and the extent of is not to be limited by the explanation.

The power receiving resonance coil 2 is a coil whose both ends are open. The power receiving resonance coil 2 is not connected to the electric circuit to increase the Q value in the same manner as the power sending resonance coil 1. The power receiving resonance coil 2 becomes an LC resonance circuit in the same manner as the power sending resonance coil 1. In the power receiving resonance coil 2, power is extracted by electromagnetic induction via a power extraction coil that is not illustrated in the drawing. The power receiving resonance coil 2 and the power extraction coil are placed at a short distance at which power can be extracted by electromagnetic induction. The power extraction coil is connected to a load device that consumes power, such as the posture control apparatus 4 or an electronic device or a battery that is not illustrated in the drawing. Between the power extraction coil and the load, an output circuit (not illustrated) that converts the extracted power to power to be consumed in the lad is connected. The output circuit is a circuit to convert voltage when the load is a posture control apparatus or an electronic device. For example, as the output circuit, a transformer or an AC-DC converter can be used. The output circuit is a circuit to convert an alternating current to a direct current when the load is a battery. For example, as the output circuit, a rectifier circuit or a charging circuit to monitor the charging amount can be used. In the case where the load is a heater, light bulb and the like that can operate with an alternating current, the wire connected to the load becomes the output circuit. Considering an equivalent circuit of the power receiving resonance coil 2, the power receiving resonance coil 2 is in the same configuration as that of the power sending resonance coil 1, having a coil unit and a capacitor. The resonance frequency of the power receiving resonance coil is identical with the resonance frequency f of the power sending resonance coil 1. Such power receiving resonance coil 2 is synchronized to a resonance coil (in this embodiment, relay resonance coil 3) close to it to generate a magnetic field resonance mode by synchronizing the resonance frequency of the power receiving resonance coil 2 with that of the resonance coil, and receives power from the resonance coil wirelessly. The power received by the power receiving resonance coil 2 is supplied to the load device by a wire via a rectifier circuit for example.

The relay resonance coil 3 is placed at a position where the magnetic field effectively works between the power sending resonance coil 1 and the power receiving resonance coil 2 in a posture according to the condition described later. The relay resonance coil 2 is not connected to any external power supply or a load device, and is in the same configuration regarding its circuit configuration as that of the power sending resonance circuit 1 and the power receiving resonance circuit 2, and the resonance frequency of the relay resonance coil 3 also identical with the resonance frequency f of the power sending resonance coil 1 and the power receiving resonance coil 2. Such relay resonance coil 3 generates a magnetic field resonance mode with its resonance frequency synchronized with two close resonance coils (the power sending resonance coil 1 and the power receiving resonance coil 2 in this embodiment) in a posture described later. Accordingly, the resonance coil 3 receives power from the resonance coil at the power sending side wirelessly, and relays the power so as to transmit it to the resonance coil at the power receiving side wirelessly.

In the wireless power supply technique using the magnetic field resonance mode as described above, even if the distance between the coils is larger than the radius of the power sending resonance coil 1 or the power receiving resonance coil 2, power can be supplied wirelessly with a high efficiency. For this reason, a dead zone is generated that would not happen in electromagnetic induction. The dead zone is not determined simply according to the distance, but is affected by the posture of the power sending resonance coil 1 and the power receiving resonance coil 2. That is, in the wireless power supply technique using magnetic resonance mode, since power supply can be performed at a distance between coils exceeding the radius of the coil, the posture of the coil also needs to be considered. In doing so, the power sending resonance coil 1 and the power receiving resonance coil 2 do not need to be placed at the position at which the coil axes are coaxial with each other. As an extreme example, wireless power supply by the magnetic resonance mode can be performed even if the power sending resonance coil 1 and the power receiving resonance coil 2 are placed on the same plane. Thus, according to the wireless power supply technique using the magnetic resonance mode, the alignment of coils has variety that would be unimaginable with electromagnetic inductance. Accordingly, the relay resonance coil 3 is provided so as to improve a decrease in the energy transfer efficiency due to the posture of the coils.

As illustrated in FIG. 1 and FIG. 2, the power sending resonance coil 1 has a coil axis C1 penetrating the center of the coil unit 10 perpendicularly, and is fixed in a way in which the coil axis 1 does not move. A magnetic line L1 extending from the power sending resonance coil curves more than the one going through the coil axis C1 straightly, the amount of curve becoming larger as the distance from the coil axis C1 becomes larger.

The power receiving resonance coil 2 has a coil axis C2 penetrating the center of the coil unit perpendicularly, and its posture is controlled by the posture control apparatus 4 so that the direction of the coil axis C2 can be changed. In FIG. 1, as an example, the power receiving resonance coil 2 is kept still in a way in which the coil axis C2 becomes parallel to the coil axis C1.

The relay resonance coil 3 has a coil axis C3 penetrating the center of the coil unit perpendicularly, and is fixed in a way in which the coil axis C1 is identical with the coil axis C1 of the power sending resonance coil 1. A magnetic line L3 extending from the relay resonance coil 3 also curves more than the one going through the coil axis C3 straightly, the amount of curve becoming larger as the distance from the coil axis C3 becomes larger. The placement position and the posture of the relay resonance coil 3 is set as follows.

The angle at which the magnetic line L1 extending from the power sending resonance coil 1 and directly going through the center of the power receiving resonance coil L2 crosses with the coil axis C2 of the power receiving resonance coil 2 is assumed as a crossing angle $\alpha$. The angle at which the magnetic line L1 extending from the power sending resonance coil 1 and directly going through the center of the power receiving resonance coil L3 crosses with the coil axis C3 of the relay resonance coil 3 is assumed as a crossing angle $\beta 0$. The angle at which the magnetic line L3 extending from the relay resonance coil 3 and directly going through the center of the power receiving resonance coil L2 crosses with the coil axis C2 of the power receiving resonance coil 2 is assumed as a crossing angle $\beta 1$. In this case, the relay resonance coil 3 is placed within a setting range in which, no matter which position is the power receiving resonance coil 2 placed, $0° \le \beta 0 \le \alpha \le 90°$, and $0° \le \beta 1 \le \alpha \le 90°$. Particularly in the case of FIG. 1 and FIG. 2, $\alpha \approx 90°$, $\beta 0 = 0°$, $\beta 1 \ll \alpha$.

By placing the relay resonance coil 3 at a position within the range of the angles $\alpha$, $\beta 0$ and $\beta 1$ as described above, the energy transfer efficiencies by the magnetic field resonance mode between the power sending resonance coil 1 and the relay resonance coil 3 and between the relay resonance coil 3 and the power receiving resonance coil 2 may be improved. This is because as the direction of action of the magnetic field with respect to the direction of the current following in the respective coils 1-3 approaches perpendicularity, more magnetic fluxes cross the coil, making it easier for a large current to flow and the energy to generate the magnetic field resonance increases. That is, between the power sending resonance coil 1 and the power receiving resonance coil 2, even in a situation where the energy transfer efficiency by the magnetic field resonance mode is low, it becomes possible to generate a relatively strong magnetic field resonance mode at the power sending side and the power receiving side by the intermediation of the relay resonance coil 3. Accordingly, power sent out from the power sending resonance coil 1 is transmitted to the power receiving resonance coil 2 wirelessly and efficiently via the relay resonance coil 3.

Meanwhile, the power sending resonance coil and the power receiving resonance coil may be a positional relationship such as a crossed positional relationship and a twisted positional relationship in which the crossing angle of the coil axes becomes an acute angle, in addition to the states illustrated in FIG. 1 and FIG. 2 in which the positions of coil axes are shifted in parallel or crossed perpendicularly. In this case, the relay resonance coil just needs to be placed such that the crossing angle of the magnetic line with respect to the coil axis stays within the set range described above. Accordingly, the direction of the action of the magnetic field is brought close to perpendicularity with respect to the direction of the current flowing in the coil, making it possible to improve the energy transfer efficiency by the magnetic field resonance mode, and to transmit power efficiently via the relay resonance coil.

The following simulation was performed regarding the effectiveness of the relay resonance coil 3.

Figure 4:
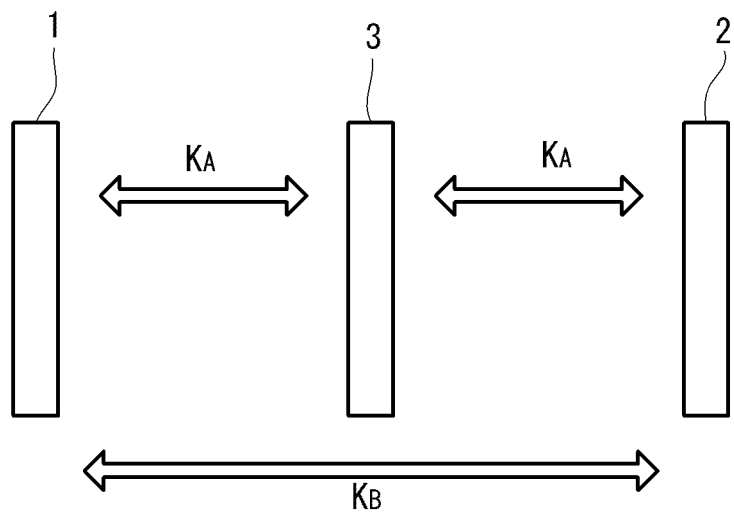
FIG. 4 is an explanatory diagram to explain the effectiveness of the case using a relay resonance coil.

As illustrated in FIG. 4, in the simulation, the case in which the relay resonance coil 3 was placed at the midpoint position between the power sending resonance coil 1 and the power receiving resonance coil 2 and alignment is made such that all the coil axes coincide with each other, and the case in which no relay resonance coil is provided were compared.

In the case in which the relay resonance coil 3 is used, the amplitude initial response characteristics of the power sending resonance coil 1, the power receiving resonance coil 2 and the relay resonance coil 3 can be obtained by solving the following a system of differential equations by complex analysis based on the coupled mode theory. In the following equations, "z" be the energy amplitude, "ω" be the natural angular frequency, "Γ" be a coefficient related to the intrinsic energy loss of an object, "κ" be the coupling coefficient between the coils, and the subscripts represent each coil or between the coils.

$$\frac{dz_1}{dt} = -i(\omega_1 - i\Gamma_1)z_1 + i\kappa_A z_3 + i\kappa_B z_2$$

$$\frac{dz_2}{dt} = -i(\omega_2 - i\Gamma_2)z_2 + i\kappa_B z_3 + i\kappa_A z_3$$

$$\frac{dz_3}{dt} = -i(\omega_3 - i\Gamma_3)z_3 + i\kappa_A z_2 + i\kappa_A z_1$$

Regarding the amplitude initial values of the power sending resonance coil 1, the power receiving resonance coil 2 and the relay resonance coil 3, in the case in which $z_1(0)=1$, $z_2(0)=0$, $z_3(0)=0$, the waveforms illustrated in FIG. 5(a) were obtained from Math. 2 above.

Meanwhile, in the case in which no relay resonance coil is used, the amplitude initial response characteristics of the power sending resonance coil 1 and the power receiving resonance coil 2 can be obtained by solving a simultaneous differential equation similar to the one described above.

$$\frac{dz_1}{dt} = -i(\omega_1 - i\Gamma_1)z_1 + i\kappa_B z_2$$

$$\frac{dz_2}{dt} = -i(\omega_2 - i\Gamma_2)z_2 + i\kappa_B z_1$$

Regarding the amplitude initial values, in the case in which $z_1(0)=1$, $z_2(0)=0$, the waveforms illustrated in FIG. 5(b) were obtained from Math. 3 above. By comparing the waveforms illustrated in FIG. 5(b) and the waveforms illustrated in FIG. 5(a), it appears that in the case in which no relay resonance coil is used, the amplitude of the power receiving resonance coil 2 becomes small, and the magnetic field resonance mode weakens.

The steady-state characteristic of the amplitude in the case in which the relay resonance coil is used is obtained by solving the following a system of differential equation by complex analysis in a similar manner as described above based on the coupled mode theory.

$$z_1 = A_1 e^{-i\omega t} \ (A_1 = 1)$$

$$\frac{dz_2}{dt} = -i(\omega_2 - i\Gamma_2)z_2 + i\kappa_B z_1 + i\kappa_A z_3 - \Gamma_w z_2$$

-continued $$\frac{dz_3}{dt} = -i(\omega_3 - i\Gamma_3)z_3 + i\kappa_A z_2 + i\kappa_A z_1$$

In Math. 4 above, "$\Gamma_w$" be a coefficient related to the amount of power extracted from the power receiving resonance coil 2 to a load in a subsequent stage and the like. When $a_1(t)=A_1=1$ is assumed for the amplitude steady-state value of the power sending resonance coil 1, as the steady-state characteristic, the waveforms illustrated in FIG. 6(a) were obtained from Math. 4 above. According to the waveforms representing the steady-state characteristic, it appears that in the case in which the relay resonance coil 3 is used, the magnetic field resonance mode is generated in a resonance state with little amplitude loss.

Meanwhile, in the case in which no relay resonance coil is used, the steady-state characteristic of the amplitude is obtained by solving a system of differential equations similar to the one above.

$$z_1 = A_1 e^{-i\omega t} \ (A_1 = 1)$$

$$\frac{dz_2}{dt} = -i(\omega_2 - i\Gamma_2)z_2 + i\kappa_B z_1 - \Gamma_w z_2$$

Figure 6:
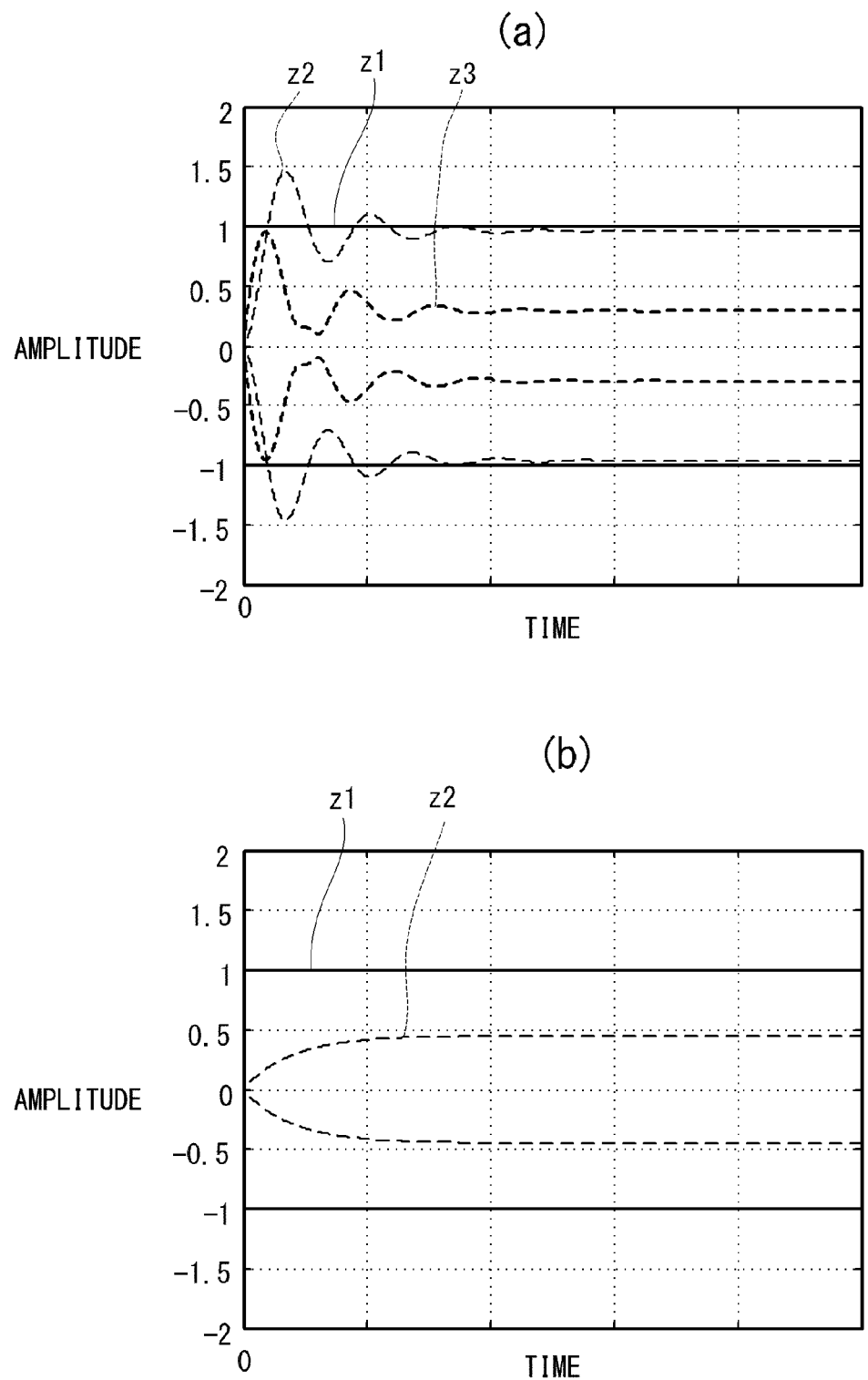
FIG. 6 is an explanatory diagram to explain the effectiveness of the case using a relay resonance coil.

In this case, as the steady-state characteristics of the amplitude, the waveforms illustrated in FIG. 6(b) were obtained from Math. 5. By comparing the waveforms illustrated in FIG. 6(b) and the waveforms in FIG. 6(a), it appears that as the steady-state characteristics in the case in which no relay resonance coil is used, the amplitude of the power receiving resonance coil 2 also becomes small, and the magnetic field resonance mode weakens.

According to the simulation results described above, it was revealed that in the case in which the relay resonance coil 3 is used, a relatively strong magnetic field resonance mode is generated, and power is transmitted from the power sending side to the power receiving side efficiently.

Therefore, according to the wireless power supply system according to the present embodiment, even in a placement state of coils which it is difficult to generate the magnetic field resonance mode by the direct action between the power sending resonance coil 1 and the power receiving resonance coil 2, the relay resonance coil 3 may be placed at an appropriate position and posture., Accordingly, a strong magnetic field resonance mode can certainly be generated via the relay resonance coil 3, and power can be transmitted from the power sending resonance coil 1 to the power receiving resonance coil 2 efficiently.

Figure 7:
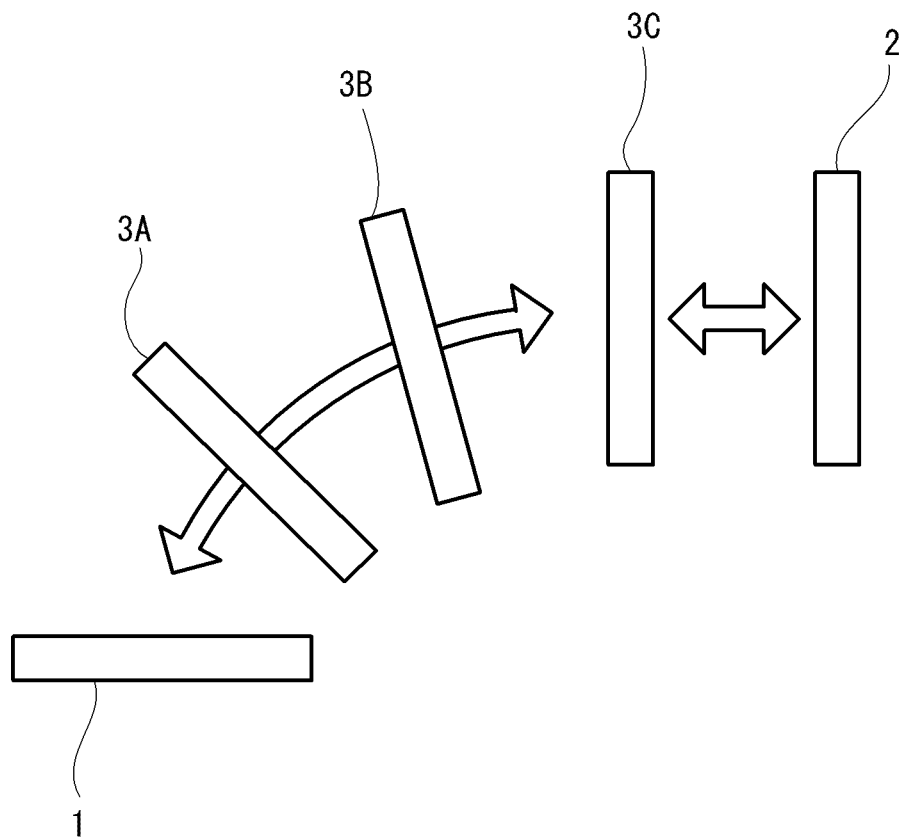
FIG. 7 is a schematic diagram illustrating another embodiment of a wireless power supply system according to the present invention.

FIG. 7 illustrates another embodiment of the wireless power supply system according to the present invention. In the wireless power supply system illustrated in the drawing, a plurality of relay resonance coils 3A-3C are placed between the power sending resonance coil 1 and the power receiving resonance coil 2. These relay resonance coils 3A-3C are placed such that the crossing angle of the magnetic line with respect to the coil axis satisfies the range described above. According to such alignment, a strong magnetic field can certainly be generated between the coils in the plurality of relay resonance coils 3A-3C, and power can be transmitted from the power sending resonance coil 1 to the power receiving resonance coil 2 efficiently. In the case in which the plurality of relay resonance coils 3A-3C are used, power can be transmitted further away efficiently by increasing its number as much as possible.

EXAMPLE 1

Figure 9:
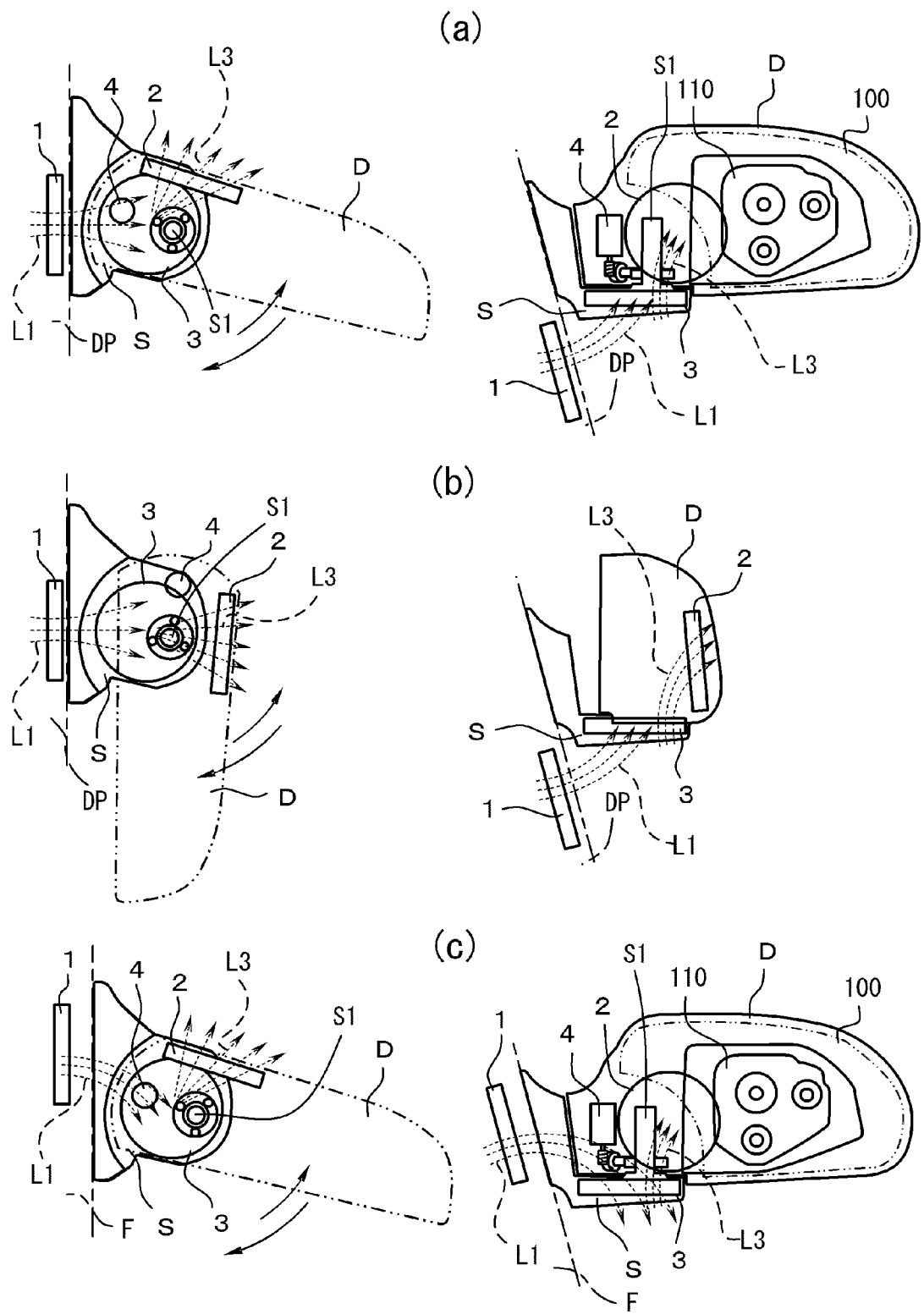
FIG. 9 is a plain view illustrating the main part of the wireless power supply system in FIG. 7 in an enlarged way.

FIG. 8 and FIG. 9 are diagrams illustrating example 1 in which the wireless power supply system according to the present invention is installed to an electric door mirror of a car.

As illustrated in FIG. 8, the wireless power supply system is configured to supply power wirelessly from inside a door panel DP of a car M to an electric door mirror D. Specifically, as illustrated in FIG. 9(a) and (b), the electric door mirror D is rotatably attached around a rotation axis S1 of a stage S for example. Opening and closing of the electric door mirror D is operated by the posture control apparatus 4 built inside. In the electric door mirror D, the power receiving resonance coil 2, a mirror 100, and a mirror angle adjustment apparatus 110 that adjust the angle of the mirror 100 are provided. The relay resonance coil 3 is fixed to the stage S. Inside the door panel DP of the car M near the door mirror D, the power sending resonance coil 1 is provided. The power sending resonance coil 1 is connected to an in-car battery that is not illustrated in the drawing via the oscillation circuit, and sends out the energy of the in-car battery as power. The power receiving resonance coil 2 is connected to the mirror angle adjustment apparatus 110 via a power circuit. The mirror angle adjustment apparatus 110 receives an instruction for adjusting the mirror 100 via wireless communication means that is not illustrated in the drawing for example, and operates with the power supplied from the power receiving resonance coil 2 as a source. Meanwhile, in the case in which as illustrated in this example the power sending resonance coil 1 is placed inside the door panel DP, the door panel is the material for letting the magnetic line through. Accordingly, the magnetic line L1 sent out from the power sending resonance coil 1 goes through the door panel DP and crosses the relay resonance coil 3. Therefore, the dustproof and waterproof of the electric door mirror DP are increased as no cable is drawn inside. The magnetic line L3 sent out from the relay resonance coil 3 crosses the power receiving resonance coil 2 regardless of the posture of the electric door mirror D. As described above, the relay resonance coil 3 improves not only the decrease due to the distance of the magnetic flux density crossing the power receiving resonance coil 2 but also the decrease due to the posture of the magnetic flux density crossing the power receiving resonance coil 2.

As illustrated in FIGS. 9(a) and (b), the directions of the coil axes of the power receiving resonance coil 2 and the relay resonance coil 3 are changed as opening and closing of the electric door mirror D are operated. The power sending resonance coil 1, the power receiving resonance coil 2 and the relay resonance coil 3 are placed such that the crossing angles of the magnetic line with respect to the coil axes satisfies the range set in the embodiment described above even if the coil axes are changed as described above. Therefore, regardless of whether the electric door mirror D is in the open state or the closed state, power for driving is wirelessly and efficiently transmitted to the mirror angle adjustment apparatus, and the angle of the mirror 100 can be adjusted based on the power. Meanwhile, the power receiving resonance coil 2 is capable of supplying power to the posture control apparatus 4 regardless of the posture of the electric door mirror D.

FIG. 9(c) is a modification example of the example 1. The power sending resonance coil 1 in the modification example is provided not inside the door panel but in a fixed part F on the car-body side on which the electric door mirror D is fixed through the stage S. The power sending resonance coil 1 placed at such a position is capable of sending out a magnetic line regardless of the material of the door panel. It becomes possible to put a separator between the power sending resonance coil 1 and the relay resonance coil 3 even when the power sending resonance coil 1 is placed in such a way.

In the example illustrated in FIG. 9, even when the posture of the electric door mirror changes, the magnetic field resonance mode is always maintained between the relay resonance coil 3 and the power receiving resonance coil 2. Meanwhile, the relay resonance coil 3 may also be partially used. For example, the alignment may be made such that the relay resonance coil functions only one of the posture in which the electric door mirror D or the closed posture. Such the alignment is suitable for a case in which a situation where in one posture, the magnetic field resonance mode works the power rending resonance coil 1 and the power receiving resonance coil 2 and in another posture, the magnetic field resonance does not work or an inferior efficiency between the coils is allowed. When the relay resonance coil 3 is placed in such a way, it is preferable to place the relay resonance coil 3 at a position at which, in the other posture, the magnetic field resonance mode by the relay resonance coil 3 works efficiently. Other than that, configuration may be made such that in either one of the posture in which the electric door mirror D or the closed posture, the magnetic field resonance mode directly works between the power sending resonance coil 1 and the power receiving resonance coil 2, and the relay resonance coil 3 functions when an intermediate posture of them is taken. Thus, as the wireless power supply system, the relay resonance coil 3 does not need to be placed such that it always functions, and its effect is naturally exerted when a situation in which the relay resonance coil 3 can function arises. Meanwhile, when an optional car-exterior imaging apparatus is to be mounted on the electric door mirror afterword, the car-exterior imaging apparatus and the power receiving resonance coil may be connected, and power may be wirelessly supplied to the car-exterior imaging apparatus.

EXAMPLE 2

FIG. 10 illustrates example 2 in which the wireless power supply system according to the present invention is applied to a plurality of notebook PCs 20-22 and a table 30 on which they are placed.

As illustrated in FIG. 10, the power sending resonance coil 1 is embedded in the table 30, and the plurality of notebook PCs 20-22 are placed around the power sending resonance coil 1 in the table 30. The power sending resonance coil 1 is connected to a power supply that is not illustrated in the drawing via an oscillation circuit. The power receiving resonance coil 2 is embedded in the notebook PCs 20-22. One of the notebook PCs 20-22, the notebook PC 20 is assumed to be in the state of being placed immediately above the power sending resonance coil 1.

In this case, as illustrated in FIG. 10, when power is supplied wirelessly to the notebook PC 20, power is wirelessly transferred directly from the power sending resonance coil 1 to the power receiving resonance coil 2, and power received via the power receiving resonance coil 1 is stored in the battery of the notebook PC 20. Meanwhile, if charging for the battery of the notebook PC 20 is completed for example, the connection between the battery and the power receiving resonance coil 2 is released, and the power receiving resonance coil 2 functions as the relay resonance coil 3. That is, the relay resonance coil 3 of the notebook PC 20 enters the state in which it is placed so that the crossing angle of the magnetic line with respect to the coil axes of the power receiving resonance coils of the notebook PCs 21, 22 placed on its both sides satisfies the range set in the embodiment described above. Accordingly, power is wirelessly supplied to the power receiving resonance coils 2 of the notebook PCs 21 and 22 efficiently via the relay resonance coil 3 of the notebook PC 20 positioned immediately above the power sending resonance coil 1. Therefore, even the notebook PCs 21 and 22 that are placed at positions at which it is difficult to directly receive power from the power sending resonance coil 1 can store power received via the relay resonance coil 3 of the notebook PC2—and the power receiving resonance coil 2.

Meanwhile, when applying the wireless power supply system to a plurality of electric devices, the power sending resonance coil may be provided in the ceiling, floor, or wall of the room in which the electric devices exist.

EXAMPLE 3

Figure 11:
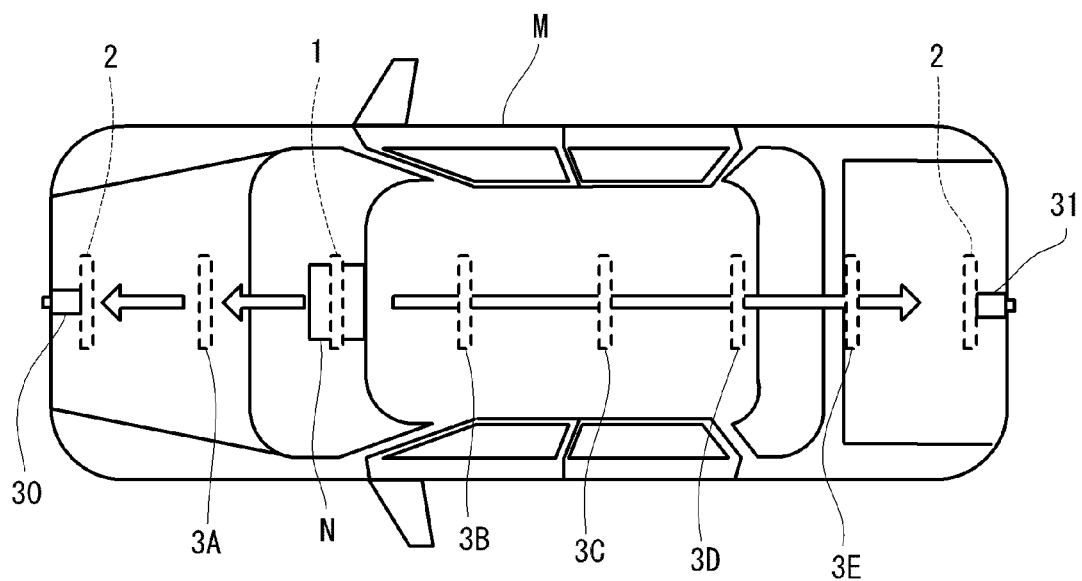
FIG. 11 is a plain view illustrating example 3 of a wireless power supply system according to the present invention.

FIG. 11 illustrates example 3 in which the wireless power supply system according to the present invention is applied to a car-exterior imaging apparatus of a car.

As illustrated in FIG. 11, the car-exterior imaging devices 30 and 31 are placed for example at the front car exterior and the rear car exterior of a car M. The car interior of the car M is provided with a navigation apparatus N that is capable of displaying the image from the car-exterior imaging devices 30 and 31. The car-exterior imaging devices 30, 31 and the navigation apparatus N is capable of transmitting and receiving an image signal and a control signal via wireless communication means that is not illustrated in the drawing. The navigation apparatus N is provided with the power sending resonance coil 1 such that power is supplied via an oscillation circuit that is not illustrated in the drawing, The navigation apparatus N sends out power wirelessly from the power sending resonance coil 1. The car-exterior imaging devices 30 and 31 are provided with the power receiving resonance coil 2 such that power is supplied to the internal circuit via a power circuit that is not illustrated in the drawing. The car-exterior imaging devices 30 and 31 are driven with power form the power receiving resonance coil 2 as a source. The relay resonance coils 3A-3E are provided in appropriate parts inside the car that fall between the power receiving resonance coil 2 and the power sending resonance coil 1 of the front car-exterior imaging apparatus 30, and between the power receiving resonance coil 2 and the power sending resonance coil 1 of the rear car-exterior imaging apparatus 31. The power sending resonance coil 1, the power receiving resonance coil 2, and the relay resonance coils 3A-3E are also placed so that the crossing angle of the magnetic line with respect to their coil axes satisfies the range set in the embodiment described above. Accordingly, even in a state in which the power sending resonance coil 1 and the power receiving resonance coil 2 are placed at a relatively large distance, power can be wirelessly transmitted efficiently via the plurality of relay resonance coils 3A-3E.

Meanwhile, when applying the wireless power supply system to a plurality of apparatuses, the resonance frequency of a coil related to power supply to one of the apparatuses may be set as f1 for example, and the resonance frequency related to another apparatus may be set as f2 that is different from the one above. When variable control is performed for the resonance frequency of the coil, power supply can be performed separately to individual devices for example, making it possible to suppress useless power consumption.

Meanwhile, the present invention is not limited to the embodiment described above.

The configuration illustrated in the embodiment above is just an example, and design modification may be performed as needed according to the specification.

The coil turns of the resonance coil and the number of connection of the capacitor may be set as needed according to the specification of the system.

As long as there is a floating capacitance to some extent in the coil unit of the resonance coil, a desired resonance frequency characteristic can be obtained without particular installation of a capacitor.

Power may be supplied to the relay resonance coil in a supplementary way.

The wireless power supply system according to the present invention is not to be applied to cars and electric devices only, and may be applied to various apparatuses or facilities that require power.

What is claimed is:

1. A wireless power supply system comprising:
a power sending resonance coil that has an air coil and a capacitor connected serially to the air coil, and transmits power as a first magnetic field wirelessly, the power sending resonance coil having a first resonant frequency within a predetermined range;
one or more relay resonance coils that resonate at a second resonant frequency within the predetermined range;
a power receiving resonance coil that resonates at a third resonant frequency within the predetermined range, the power receiving resonance coil being placed in a position where the power receiving resonance coil does not receive power directly from the power sending resonance coil; and
a posture control apparatus that controls a direction of a coil axis of at least one of the power sending resonance coil, the power receiving resonance coil and the relay resonance coil, the direction of the coil axis being changed by the posture control apparatus,
wherein the one or more relay resonance coils relay power from the power sending resonance coil to the power receiving coil using a second magnetic field inducted by the first magnetic field,
the second magnetic field inducts a third magnetic field in the power receiving coil, and
the power receiving coil receives power using the third magnetic field.

2. The wireless power supply system according to claim 1, wherein the power sending resonance coil and the power receiving resonance coil are placed such that their coil axes are in a crossed, parallel or twisted positional relationship.

3. The wireless power supply system according to claim 1, wherein the power receiving resonance coil and the relay resonance coil are provided in an electric door mirror of a car operated by the posture control apparatus, and the power sending resonance coil is provided in a car body of the car.

4. The wireless power supply system according to claim 1, wherein the power receiving resonance coil is provided in each of a plurality of electric devices, and the power sending resonance coil is provided in a table on which the plurality of electric devices can be placed, or in a ceiling, floor or wall of a room in which the plurality of electric devices exist.

5. The wireless power supply system according to claim 4, wherein a first power receiving resonance coil in a first electric device among the plurality of electric devices relays power to a second power receiving resonance coil in a second electric device among the plurality of electric devices.

6. The wireless power supply system according to claim 1, wherein the power sending resonance coil and the relay resonance coil are provided in a car body of a car, and the power receiving resonance coil is provided in a car-exterior imaging apparatus installed on an exterior of the car.

7. The wireless power supply system according to claim 1, wherein the power sending resonance coil, the power receiving resonance coil and the relay resonance coil includes a capacitor.

\* \* \* \* \*